U S010122175B1

United States Patent
Zhang et al.

(10) Patent No.: US 10,122,175 B1
(45) Date of Patent: Nov. 6, 2018

(54) VOLTAGE ANGLE CONTROL OF A FUNDAMENTAL FRONT END CONVERTER FOR A GRID

(71) Applicant: Rockwell Automation Technologies, Inc., Mayfield Heights, OH (US)

(72) Inventors: Zhendong Zhang, Mequon, WI (US); Ahmed S. Mohamed Sayed Ahmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/890,207

(22) Filed: Feb. 6, 2018

(51) Int. Cl.
  *H02J 3/38* (2006.01)
  *H02J 3/18* (2006.01)
  *H02J 3/00* (2006.01)

(52) U.S. Cl.
  CPC ...... *H02J 3/38* (2013.01); *H02J 3/18* (2013.01); *H02J 2003/007* (2013.01)

(58) Field of Classification Search
  CPC ........ H02P 21/09; H02P 21/16; H02P 21/141; Y02T 10/82; H02M 7/53873; H02M 7/48; H02J 3/18; H02J 3/50

USPC ......... 318/400.35, 599, 601, 798, 812, 432, 318/434, 400.3; 700/286, 297; 363/40, 363/95

See application file for complete search history.

(56) References Cited

U.S. PATENT DOCUMENTS

| 7,243,006 | B2 * | 7/2007 | Richards | G06F 17/5036 318/801 |
| 7,633,775 | B2 * | 12/2009 | Datta | H02M 7/49 363/41 |
| 7,986,116 | B2 * | 7/2011 | Imura | H02P 21/0003 318/400.02 |
| 8,693,228 | B2 * | 4/2014 | Matan | H02J 3/18 363/97 |
| 9,331,487 | B2 * | 5/2016 | Yuan | H02J 3/382 |

* cited by examiner

Primary Examiner — Rajnikant Patel
(74) Attorney, Agent, or Firm — Kunzler, PC (57) ABSTRACT

For voltage angle control, a control module generates a control signal for a grid. A canceling function generates an output voltage angle as a function of the control signal that regulates the grid. The output voltage signal includes an angular canceling function that cancels an angular control portion of a dynamic response of the grid such that the control signal controls the grid as a second-order quadrant-axis current.

20 Claims, 9 Drawing Sheets

VOLTAGE ANGLE CONTROL OF A FUNDAMENTAL FRONT END CONVERTER FOR A GRID

BACKGROUND INFORMATION

The subject matter disclosed herein relates to voltage angle control of a Fundamental Front End (FFE) converter for a grid.

BRIEF DESCRIPTION

A controller for voltage angle control is disclosed. The controller includes a control module that generates a control signal for a grid. The controller further includes a canceling function that generates an output voltage angle as a function of the control signal that regulates the grid. The output voltage signal includes an angular canceling function that cancels an angular control portion of a dynamic response of the grid such that the control signal controls the grid as a second-order quadrant-axis current. At least a portion of the canceling function and the control module include one or more of hardware and a processor executing code.

A method for voltage angle control is disclosed. The method generates a control signal for a grid. The method further generates an output voltage angle as a function of the control signal that regulates the grid. The output voltage signal includes an angular canceling function that cancels an angular control portion of a dynamic response of the grid such that the control signal controls the grid as a second-order quadrant-axis current.

A system for voltage angle control is disclosed. The system includes a grid, a control module, and a canceling function. The control module generates a control signal for the grid. The canceling function generates an output voltage angle as a function of the control signal that regulates the grid. The output voltage signal includes an angular canceling function that cancels an angular control portion of a dynamic response of the grid such that the control signal controls the grid as a second-order quadrant-axis current. At least a portion of the canceling function and the control module include one or more of hardware and a processor executing code.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Python, Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Figure 1A:
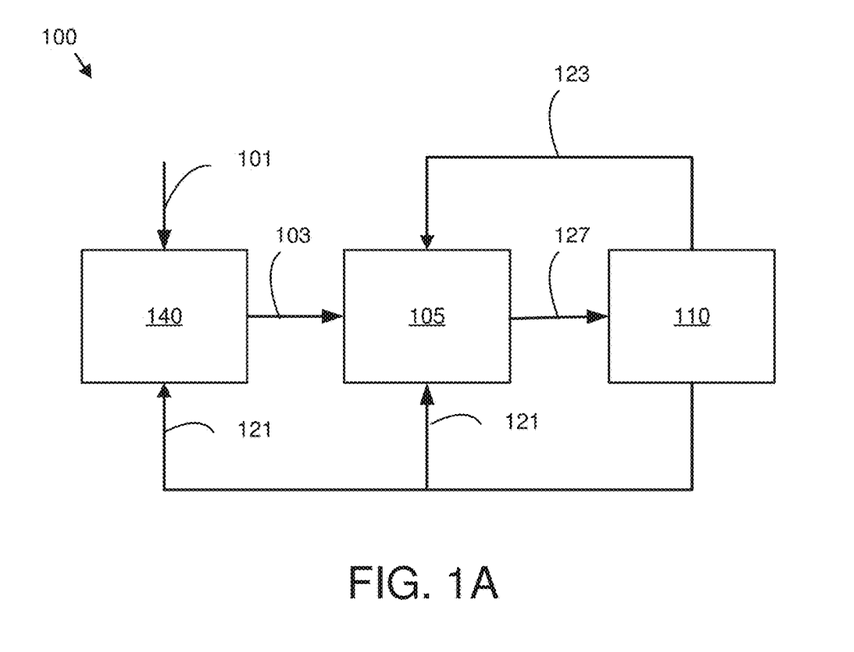
FIG. 1A is a schematic block diagram of a flux vector control system according to an embodiment.

FIG. 1A is a schematic block diagram of a voltage angle control system 100. The system 100 may control a grid 110 to regulate a bus voltage as a Fundamental Front End (FFE) converter. Direct-axis- (d-axis), quadrant-axis- (q-axis) based control of an FFE converter requires complicated firing angle calculations and a special waveform generator, and often results in poor regulation performance.

The embodiments described herein employ flux angle control by generating an output voltage angle as will be described hereafter. The output voltage angle includes an angular canceling function that cancels an angular control portion of a dynamic response of the grid 110 so that a control signal controls the grid 110 as a second-order quadrant-axis current.

In the depicted embodiment, the system 100 includes a bus regulator 140, a controller 105, and the grid 110. The bus regulator 140 generates a q-axis current signal 103 in response to a bus regulation voltage 101. The q-axis current signal 103 may be generated in part based on a current feedback signal 121 from the grid 110. In one embodiment, the q-axis current signal 103 is generated to control a bus voltage.

The controller 105 receives the q-axis current signal 103 and generates a converter outputs 127 based on the q-axis current signal 103, the current feedback signal 121, and a commanded output voltage magnitude 123 from the grid 110. The generation of the q-axis current signal 103, the current feedback signal 121, and the commanded output voltage magnitude 123 by the controller 105 and grid 110 are described in more detail hereafter.

Figure 1B:
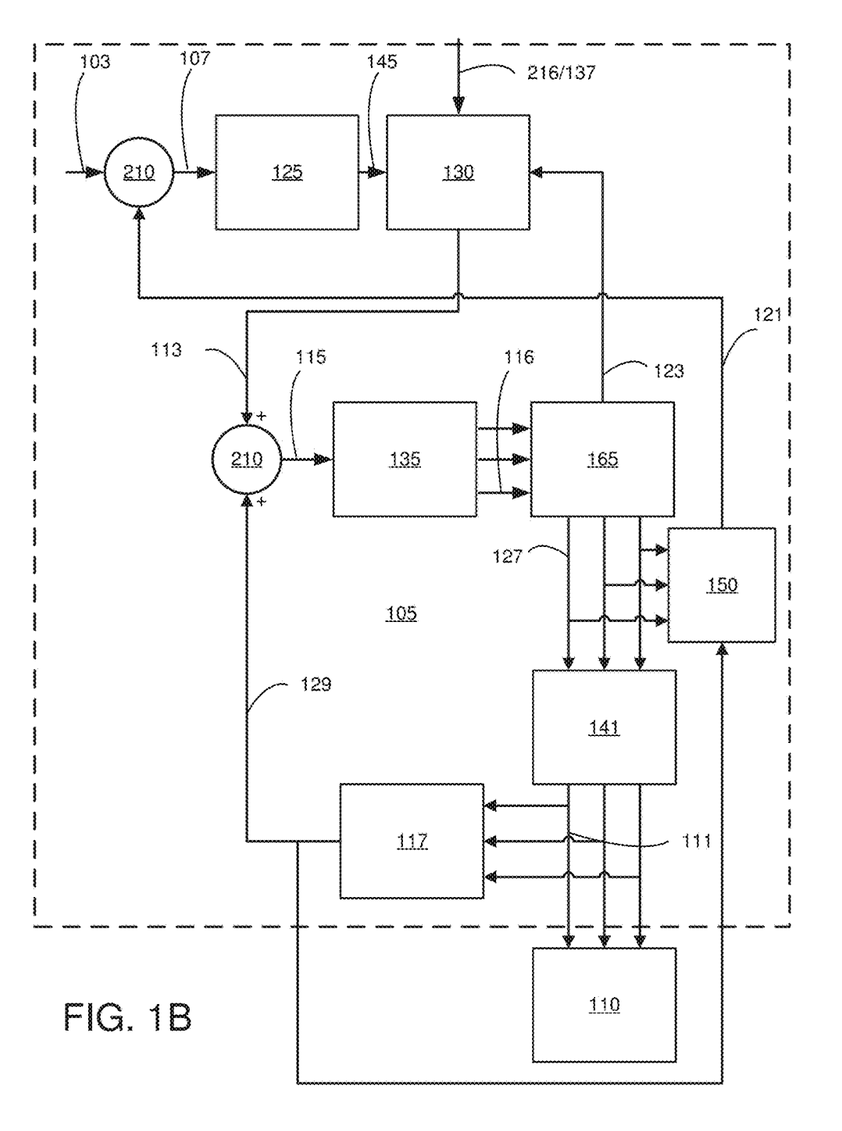
FIG. 1B is a schematic block diagram of a controller according to an embodiment.

FIG. 1B is a schematic block diagram of a controller 105. The controller 105 generates the converter outputs 127 in response to the q-axis current signal 103 to control the grid 110. In the depicted embodiment, the controller 105 includes a control module 125, a canceling function 130, one or more summing functions 210, a waveform generator 135, a converter 165, a three-phase filter 141, a phase lock loop 117, and a DQ Transform 150. The controller 125 and the canceling function 130 may be implemented with hardware elements, a processor, or combinations thereof.

The phase lock loop 117 may generate a field orientation signal 129 that indicates a phase of the grid voltage angle of the grid 110 from sampling filtered converter outputs 111. The DQ Transform 150 may sample the converter outputs 127 and the field orientation signal 129 and generate the current feedback signal 121. The converter outputs 127 are three-phase outputs. The current feedback signal 121 may be a direct-quadrature-zero signal. In one embodiment, the current feedback signal 121 is a vector comprising a d-axis feedback current $I_{daf}$ and a q-axis feedback current $I_{qaf}$.

The current feedback signal 121 is summed by a summing function 210 with the q-axis current signal 103 to form a proportional-integral input 107. The controller 125 may generate a control signal M 145 as a transfer function of the q-axis current signal 103 and the current feedback signal 121 as will be described hereafter in FIGS. 3A-B. In one embodiment, the controller 125 generates a control signal M 145 as a transfer function of the proportional-integral input 107. The control signal M 145 regulates the grid 110.

The canceling function 130 generates the output voltage angle 113 as a function of the control signal M 145, a grid frequency 216 of the grid 110, a grid voltage 137 of the grid 110, and the commanded output voltage magnitude 123 from the converter 165. The output voltage angle 113 comprises an angular canceling function that cancels the angular control portion of a dynamic response of the grid 110 such that the control signal M 145 controls the grid 110 as a second-order q-axis current.

The output voltage angle 113 may be combined with the field orientation signal 129 using a summing function 210 to generate an angular control signal 115. The angular control signal 115 may drive a waveform generator 135. The waveform generator 135 may generate switching signals 116 that drive a converter 165. In one embodiment, the waveform generator 135 generates six-step mode switching signals 116. The converter 165 may generate the converter outputs 127 based on the switching signals 116 to regulate the grid 110. The converter 165 may generate the converter outputs 127 with a six-step mode operation. The three-phase filter 141 may filter the converter outputs to generate the filtered converter outputs 111.

Figure 2A:
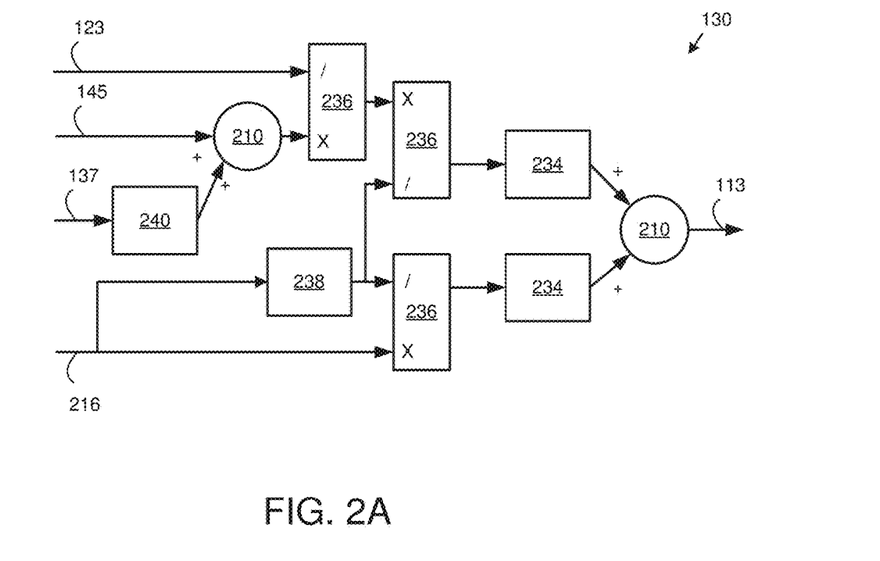
FIG. 2A is a schematic block diagram of a canceling function according to an embodiment.

FIG. 2A is a schematic block diagram of a canceling function 130. In the depicted embodiment, the canceling function 130 includes the $$\frac{R_s \cdot V_{grid}}{L_s}$$

function 240, a $$\sqrt{\left(\frac{R_s}{L_s}\right)^2 + \omega_g^2}$$

function 238, one or more summing functions 210, one or more multiplier/divide functions 236, and one or more arcsin functions 234. As used herein, $R_s$ is a lumped resistance between the converter 165 the grid 110, $L_s$ is a converter outputs three-phase filter inductance for the converter 165, $V_{grid}$ is the grid voltage 137, and $\omega_g$ is a grid frequency 216. The canceling function 130 receives the control signal M 145, the commanded output voltage magnitude $|v_s|$ 123, the grid voltage $V_{grid}$ 137 and the grid frequency $\omega_g$ 216, and generates the output voltage angle 113.

The canceling function 130 models the control signal M 145 as shown in Equation 1, wherein $\theta_v$ is the output voltage angle 113 in a synchronous reference frame.

$$M = -\omega_g |v_s| \cos\theta_v + \frac{R_s}{L_s} |v_s| \sin\theta_v + |v_s| \cos\theta_v \frac{d\theta_v}{dt} - \frac{R_s}{L_s} V_{grid} \quad \text{Equation 1}$$

In one embodiment, the canceling function 130 generates the output voltage angle $\theta_v$ 113 as expressed in Equation 2 by omitting the derivative term in Equation 1.

$$\theta_v = a\sin\left(\frac{M + \frac{R_s \cdot V_{grid}}{L_s}}{|v_s|\sqrt{\left(\frac{R_s}{L_s}\right)^2 + \omega_g^2}}\right) + a\sin\left(\frac{\omega_g}{\sqrt{\left(\frac{R_s}{L_s}\right)^2 + \omega_g^2}}\right) \quad \text{Equation 2}$$

Figure 2B:
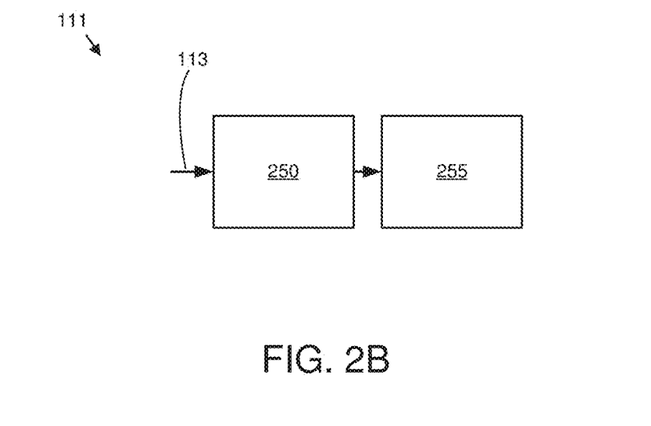
FIG. 2B is a schematic block diagram of a plant model according to an alternate embodiment.

An angular canceling function of the output voltage angle 113 effectively cancels the angular control portion 250 of the three-phase filter 141 as will be described hereafter. As a result, the grid 110 and three-phase filter 141 may be controlled by the control signal M 145 as the second-order q-axis current Iq 255, wherein the second-order q-axis current Iq 255 is modeled as shown in Equations 3 and 4.

$$I_q = \frac{1}{L_s s^2 + (2 \cdot R_s)s + \left(\frac{R_s^2}{L_s} + \omega_g^2 L_s\right)} \quad \text{Equation 3}$$

FIG. 2B is a schematic block diagram of a plant model 111 of the grid 110 and the three-phase filter 141. In the depicted embodiment, the plant model 111 includes the angular control portion 250 and the second-order q-axis current portion 255. Because the output voltage angle 113 effectively cancels the angular control portion 250 of the gird 110, the control signal M 145 can be generated to control only the second-order q-axis current 255 of the grid 110 and the three-phase filter 141, greatly simplifying the transfer function for the control module 125 as will be described hereafter in FIGS. 3A-B.

Figure 3A:
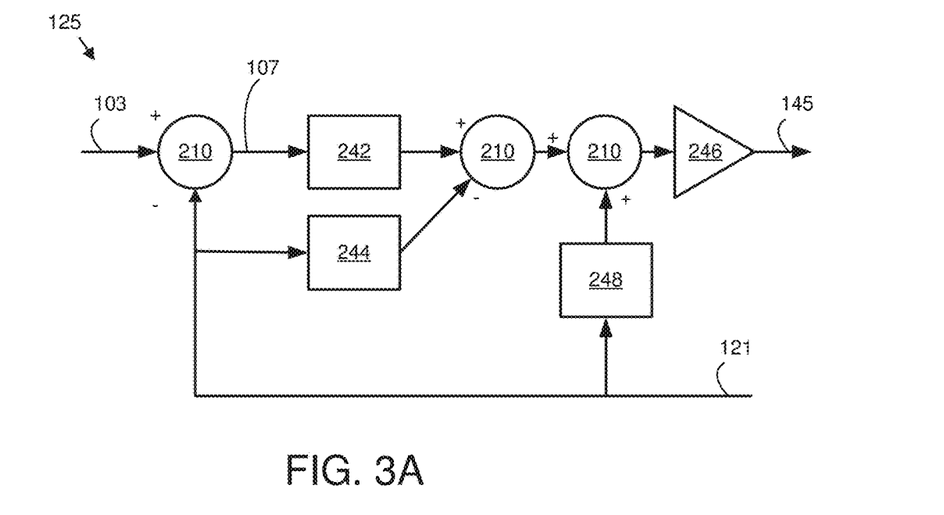
FIG. 3A is a schematic block diagram of a control module according to an embodiment.

FIG. 3A is a schematic block diagram of the control module 125. In the depicted embodiment, the control module 125 generates the control signal M 145 as the transfer function of a q-axis current signal 103 and a current feedback signal 121. The transfer function may be a proportional-integral-derivative transfer (PID) function. The control module 125 includes one or more summing functions 210, a proportional-integral control function 242, a derivative control function 244, a $$\omega_g^2 + \frac{R_s^2}{L_s^2} \text{ function } 248,$$

and a $L_s$ gain function 246. The control module 125 may implement the transfer function TF as illustrated in Equation 4, wherein the transfer function TF is a closed-loop transfer function, $k_p$ is a proportional gain for the proportional-integral control function 242, $k_d$ is a derivative gain for the derivative control function 244, and $k_i$ is an integral gain for the proportional-integral control function 242.

$$TF = \frac{k_p s + k_i}{s^3 + \left(\frac{2R_s}{L_s} + k_d\right)s^2 + k_p s + k_i} \quad \text{Equation 4}$$

In one embodiment, $k_p$, $k_d$, and $k_i$, are calculated using Equations 5-7.

$$k_p = 3\xi_2 \omega_n^2 \quad \text{Equation 5}$$

$$k_d = 3\xi_1 \omega_n - \frac{2R_s}{L_s} \quad \text{Equation 6}$$

$$k_i = \omega_n^3 \quad \text{Equation 7}$$

In one embodiment, if the converter 165 is operating in a six-step mode, the control module 125 implements the closed-loop transfer function TF as illustrated in Equation 8.

$$TF = \frac{\frac{k_p s + k_i}{1.5 \, T_{PWM}}}{s^4 + \left(a_1 + \frac{1}{1.5 \, T_{PWM}}\right)s^3 + \left(a_0 + \frac{(a_1 + k_d)}{1.5 \, T_{PWM}}\right)s^2 + \frac{k_p}{1.5 \, T_{PWM}}s + \frac{k_i}{1.5 \, T_{PWM}}} \quad \text{Equation 8}$$

If the converter 165 is operating in six-step mode, $k_p$, $k_d$, and $k_i$, may be calculated using Equations 9-11.

$$k_p = 1.5 T_{PWM} 4\xi_3 \omega_n^3 \quad \text{Equation 9}$$

$$k_d = 1.5 T_{PWM} (6\xi_2 \omega_n^2 - a_0) - a_1 \quad \text{Equation 10}$$

$$k_i = 1.5 T_{PWM} \omega_n^4 \quad \text{Equation 11}$$

In one embodiment, $\omega_n$ is calculated as shown in Equation 12, $a_0$ is calculated as shown in Equation 13, $a_1$ is calculated as shown in Equation 14, and $x_1$, $x_2$, and $x_3$ are nonzero damping ratios. In a certain embodiment, $x_1=0.5$, $x_2=1.0$, and $x_3=1.0$.

$$\omega_n = \frac{1}{4\xi_1}\left(a_1 + \frac{1}{1.5\, T_{PWM}}\right) \quad \text{Equation 12}$$

$$a_0 = \frac{R_s^2}{L_s^2} + \omega_g^2 \quad \text{Equation 13}$$

$$a_1 = \frac{2 \cdot R_s}{L_s} \quad \text{Equation 14}$$

Figure 3B:
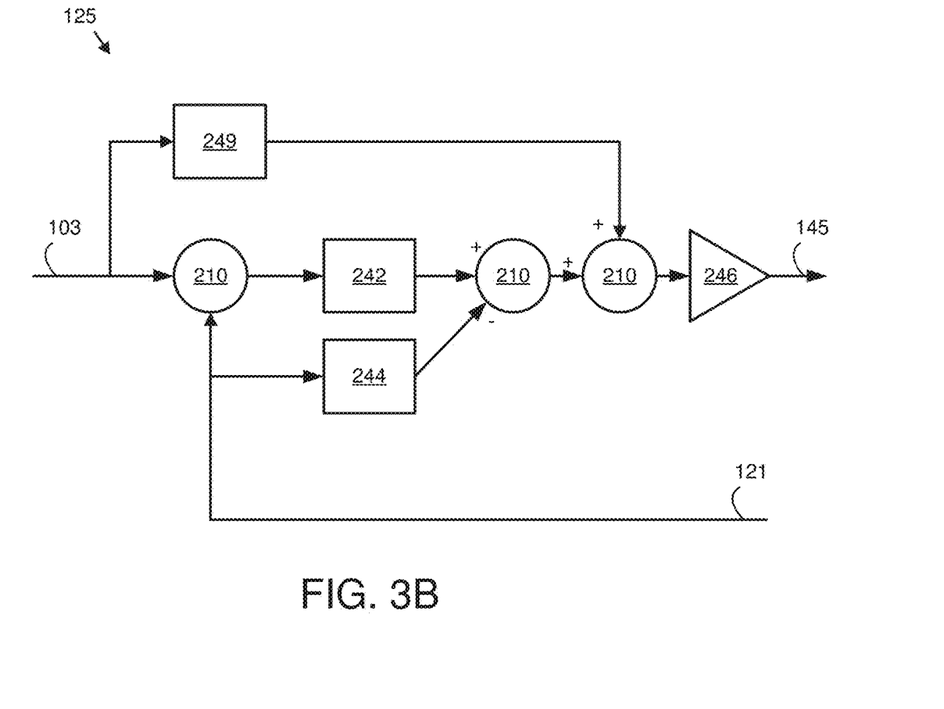
FIG. 3B is a schematic block diagram of a control module according to an alternate embodiment.

FIG. 3B is a schematic block diagram of an alternate embodiment of the control module 125. In the depicted embodiment, the control module 125 does not have the $$\omega_g^2 + \frac{R_s^2}{L_s^2} \text{ function 248.}$$

Instead, a $$\omega_g^2 + \frac{R_s^2}{L_s^2}$$

feedforward function 249 is employed. In one embodiment, $k_p$ is calculated using Equation 15 for the control module 125 of FIG. 3B.

$$k_p = 1.5 T_{PWM} 4\omega_n^3 - a_0 \quad \text{Equation 15}$$

Figure 4:
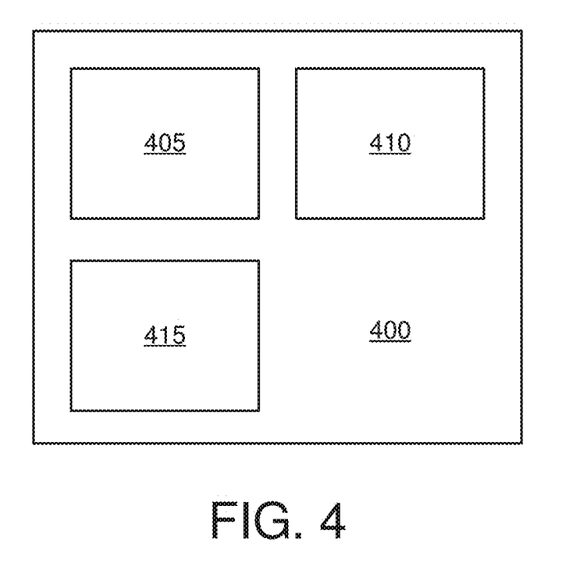
FIG. 4 is a schematic block diagram of a computer according to an embodiment.

FIG. 4 is a schematic block diagram of a computer 400. The computer 400 may be embodied in the controller 105. In a certain embodiment, the computer 410 includes the bus regulator 140 and/or the waveform generator 135. In addition, the computer 400 may comprise the control module 125, the canceling function 130, and one or more summing functions 210. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. In one embodiment, the processor 405 is a digital signal processor. The communication hardware 415 may communicate with other devices such as the waveform generator 135 and/or the bus regulator 140.

Figure 5:
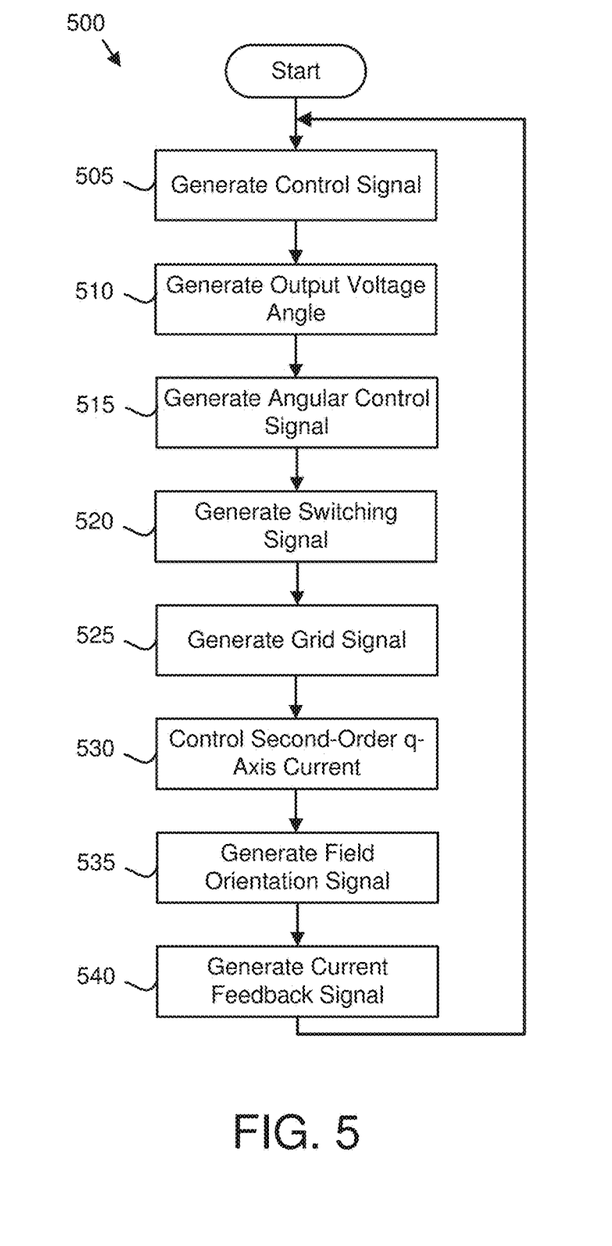
FIG. 5 is a schematic flow chart diagram of a voltage angle control method according to an embodiment.

FIG. 5 is a schematic flow chart diagram of a voltage angle control method 500. The method 500 may employ voltage angle control to control the grid 110. The method 500 may be performed by the system 100 and/or the controller 105.

The method 500 starts, and in one embodiment, the control module 125 generates 505 the control signal M 145 for the grid 110. The controller 125 may generate 505 the control signal M 145 as a transfer function of the q-axis current signal 103 and the current feedback signal 121. The transfer function may be the transfer function of Equation 4. Alternatively, if the converter 165 operates in six-step mode, the transfer function may be the transfer function of Equation 8.

The canceling function 130 may generate 510 the output voltage angle 113. The output voltage angle 113 may be generated 510 as a function of the control signal M 145. In addition, the output voltage angle $\theta_v$ 113 may be generated 510 as the function of the control signal M 145, the grid frequency $\omega_g$ 216, the grid voltage $V_{grid}$ 137, and the commanded output voltage magnitude 123 as illustrated in Equation 2.

The controller 105 may further generate 515 the angular control signal 115. In one embodiment, the angular control signal 115 is generated 515 as the output voltage angle 113 summed with the field orientation signal 129.

The waveform generator 135 may generate 520 the switching signal 116 as a function of the angular control signal 115 and drive the converter 165 with the switching signal 116.

The converter 165 generates 525 the converter outputs 127 that regulates the grid 110. The converter outputs 127 may be generated 525 as a function of the switching signal 116. The converter 165 and drive signals 127 may be powered by a drive bus (not shown). In addition, the converter 165 may generate 525 the commanded output voltage magnitude 123 that measures a voltage of the drive bus.

Because the converter outputs 127 are generated 525 based on the switching signal 116 and the angular control signal 115 that is based on the output voltage angle 113, the drive signals 127 include the angular canceling function. As a result, the angular control portion 250 of the grid 110 is canceled by the angular canceling function. The control signal M 145 thus controls 530 the grid 110 as the second-order quadrant-axis current 255

In one embodiment, the phase lock loop 117 generates 535 the field orientation signal 129. The field orientation signal 129 may indicate the grid voltage angle of the grid 110. In addition, the DQ Transform 150 generates 540 the current feedback signal 121. The current feedback signal 121 may be generated 540 as a product of a Clarke transform and a Park transform of the converter outputs 127. The method 500 may further loop to generate 505 the control signal M 145.

Figure 6A:
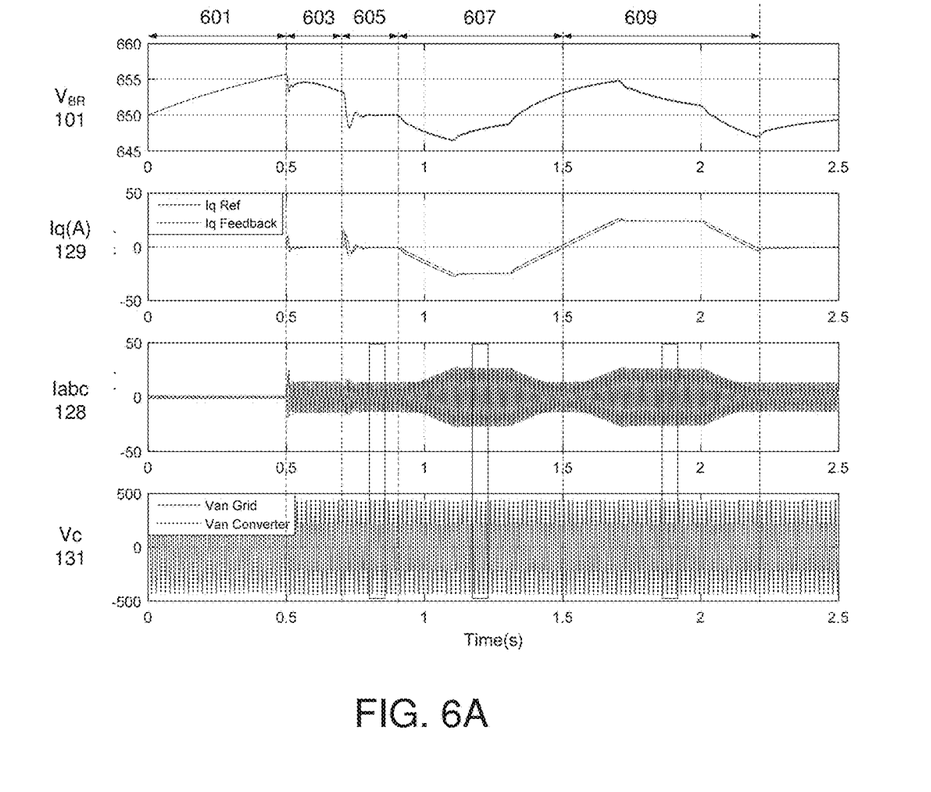
FIG. 6A is a graph showing motoring and regenerating according to an embodiment.

FIG. 6A is a graph showing motoring and regenerating of the grid 110. The bus reference voltage $V_{BR}$ 101, a current Iq(A) 129 of the proportional-integral input 107, a converter output current Iabc 128 for the converter outputs 127, and a converter output voltage Vc 131 for the converter outputs 127 are shown for five cases including the converter 165 being off 601, the converter 165 being on for a q-axis current signal 103 equal to zero 603, the converter 165 being on and bus regulation being on 605, inverter side motoring 607, and inverter side regenerating 609.

Figure 6B:
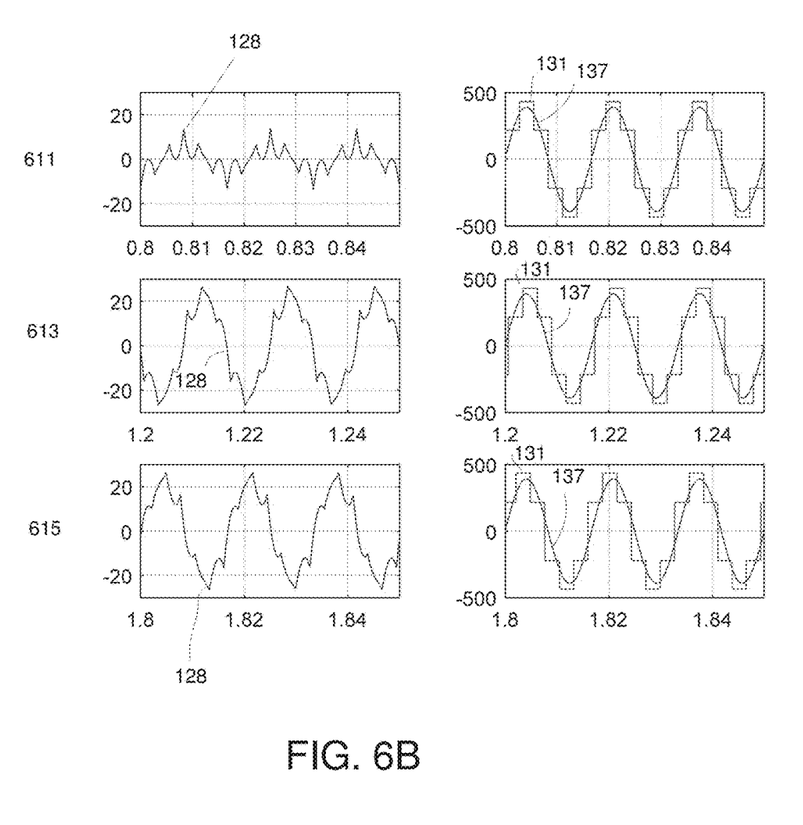
FIG. 6B is a graph showing waveforms according to an embodiment.

FIG. 6B is a graph showing waveforms for the converter outputs 127 and the grid 110. The converter output current 128, the converter output voltage Vc 131 of the converter outputs 127, and the grid voltage 137 of the grid 110 are shown for the q-axis current signal Iq 103 equals zero 611, the q-axis current signal Iq 103 less than zero 613, and the q-axis current signal Iq 103 greater than zero 615. As shown, the flow of the active q-axis current signal Iq 103 is modified by changing the phase relationship between the converter output voltage 131 and the grid voltage 137.

Figure 6C:
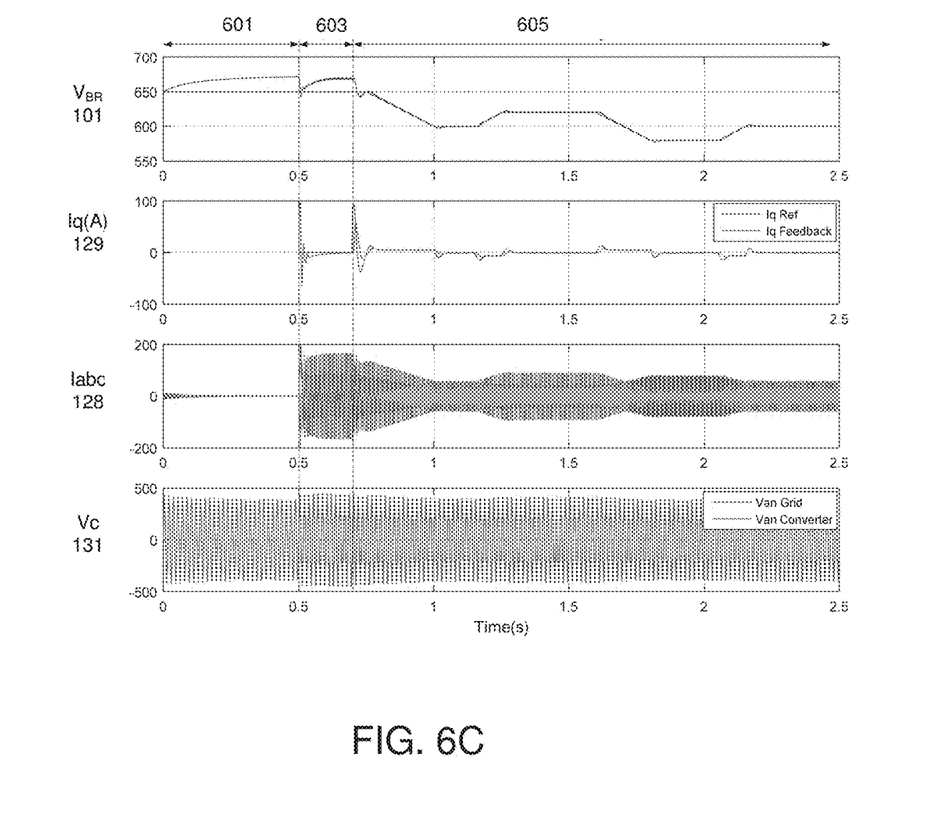
FIG. 6C is a graph showing bus regulator response according to an embodiment.

FIG. 6C is a graph showing bus regulator response. The bus reference voltage $V_{BR}$ 101, the current Iq(A) 129, the converter output current Iabc 128, and the converter output voltage Vc 131 are shown for three cases including the converter 165 being off 601, the converter 165 being on for a q-axis current signal 103 equal to zero 603, and the converter 165 being on and bus regulation being on 605.

Problem/Solution

FFE have traditionally been unable to perform flux vector control. The firing angle calculation have been computationally too complicated. In addition, the firing angle calculation has required a special waveform generator. Further, using firing angle calculation for FFE has resulted in poor performance.

The embodiments described herein generate an output voltage angle 113 that includes an angular canceling function that cancels the angular control portion 250 of the dynamic response of the grid 110. As a result, the control signal 145 controls the grid 110 as if the grid 110 were a second-order quadrant axis current 255. As a result, FFE including six step mode operation may be used to control the grid 110.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A controller comprising:
   a control module that generates a control signal for a grid; and
   a canceling function that generates an output voltage angle as a function of the control signal that regulates the grid, wherein the output voltage angle comprises an angular canceling function that cancels an angular control portion of a dynamic response of the grid such that the control signal controls the grid as a second-order quadrant-axis current,
   wherein at least a portion of the canceling function and the control module comprise one or more of hardware and a processor executing code.

2. The controller of claim 1, wherein the output voltage angle is further generated as a function of the control signal, a commanded output voltage magnitude, a grid voltage, and a grid frequency.

3. The controller of claim 1, wherein the control signal is generated as a transfer function of a quadrant-axis current signal and a current feedback signal.

4. The controller of claim 3, wherein the transfer function is a proportional-integral-derivative transfer function.

5. The controller of claim 4, wherein the transfer function TF is a closed loop transfer function calculated as $$TF = \frac{k_p s + k_i}{s^3 + \left(\frac{2R_s}{L_s} + k_d\right)s^2 + k_p s + k_i},$$

where s is the frequency domain order, $R_s$ is a lumped resistance between a converter and the grid, $L_s$ is a converter outputs three-phase filter inductance, $k_p$ is a proportional gain, $k_d$ is a derivative gain, and $k_i$ is an integral gain.

6. The controller of claim 5, wherein $k_p$ is calculated as $k_p=3\xi_2\omega_n^2$, $k_d$ is calculated as, $$k_d = 3\xi_1\omega_n - \frac{2R_s}{L_s},$$

and $k_i$ is calculated as $k_i=\omega_n^3$, where $\omega_n$ is a natural oscillation frequency.

7. The controller of claim 1, wherein a field orientation signal from the grid and the output voltage angle are combined to generate an angular control signal.

8. The controller of claim 1, wherein a waveform generator drives a converter with a switching signal generated as a function of the angular control signal and the converter is connected to the grid through a three-phase filter.

9. A method comprising:
   generating, by use of a processor, a control signal for a grid; and
   generating with a canceling function an output voltage angle as a function of the control signal that regulates the grid, wherein the output voltage angle comprises an angular canceling function that cancels an angular control portion of a dynamic response of the grid such that the control signal controls the grid as a second-order quadrant-axis current.

10. The method of claim 9, wherein the output voltage angle is further generated as a function of the control signal, a commanded output voltage magnitude, a grid voltage, and a grid frequency.

11. The method of claim 9, wherein the control signal is generated as a transfer function of a quadrant-axis current signal and a current feedback signal.

12. The method of claim 11, wherein the transfer function is a proportional-integral-derivative transfer function.

13. The method of claim 11, wherein the transfer function TF is a closed loop transfer function calculated as $$TF = \frac{k_p s + k_i}{s^3 + \left(\frac{2R_s}{L_s} + k_d\right)s^2 + k_p s + k_i},$$

where s is the frequency domain order, $R_s$ is a lumped resistance between a converter and the grid, $L_s$ is a converter outputs three-phase filter inductance, $k_p$ is a proportional gain, $k_d$ is a derivative gain, and $k_i$ is an integral gain.

14. The method of claim 13, wherein $k_p$ is calculated as $k_p=3\xi_2\omega_n^2$, $k_d$ is calculated as, $$k_d = 3\xi_1\omega_n - \frac{2R_s}{L_s},$$

and $k_i$ is calculated as $k_i=\omega_n^3$, where $\omega_n$ is a natural oscillation frequency.

15. The method of claim 9, wherein a field orientation signal from the grid and the output voltage angle are combined to generate an angular control signal.

16. The method of claim 9, wherein a waveform generator drives a converter with a switching signal generated as a function of the angular control signal and the converter is connected to the grid through a three-phase filter.

17. A system comprising:
   a grid;

a control module that generates a control signal for the grid; and a canceling function that generates an output voltage angle as a function of the control signal that regulates the grid, wherein the output voltage angle comprises an angular canceling function that cancels an angular control portion of a dynamic response of the grid such that the control signal controls the grid as a second-order quadrant-axis current, wherein at least a portion of the canceling function and the control module comprise one or more of hardware and a processor executing code.

18. The system of claim 17, wherein the output voltage angle is further generated as a function of the control signal, a commanded output voltage magnitude, a grid voltage, and a grid frequency.

19. The system of claim 17, wherein the control signal is generated as a transfer function of a quadrant-axis current signal and a current feedback signal.

20. The system of claim 19, wherein the transfer function is a proportional-integral-derivative transfer function.

* * * * *